United States Patent [19]

Goldstein et al.

[11] Patent Number: 4,698,752

[45] Date of Patent: Oct. 6, 1987

[54] DATA BASE LOCKING

[75] Inventors: Alan J. Goldstein, Livingston; Terry R. Nusser, Flemington, both of N.J.

[73] Assignee: American Telephone and Telegraph Company AT&T Bell Laboratories, Murray Hill, N.J.

[21] Appl. No.: 858,085

[22] Filed: Apr. 29, 1986

Related U.S. Application Data

[63] Continuation of Ser. No. 441,732, Nov. 15, 1982, abandoned.

[51] Int. Cl.⁴ .............................................. G06F 15/40
[52] U.S. Cl. .................................... 364/200; 364/300
[58] Field of Search ... 364/200 MS File, 900 MS File, 364/300, 200, 900

[56] References Cited

U.S. PATENT DOCUMENTS

| | | | |
|---|---|---|---|
| 3,422,401 | 1/1969 | Lucking | 364/200 |
| 3,435,418 | 3/1969 | Evans et al. | 364/200 |
| 3,916,387 | 10/1975 | Woodrum | 364/200 |
| 4,086,628 | 4/1978 | Woodrum | 364/200 |
| 4,276,597 | 6/1981 | Dissly et al. | 364/200 |
| 4,399,504 | 8/1983 | Obermarck et al. | 364/200 |
| 4,439,830 | 3/1984 | Chueh | 364/200 |
| 4,468,732 | 8/1984 | Raver | 364/200 |
| 4,476,528 | 10/1984 | Matsumoto et al. | 364/200 |

OTHER PUBLICATIONS

Cattell, G. G., "An Enity-Based Database User Interface", Proc. ACM-SIGMOD., May 14-16, 1980, pp. 144-150.

"Graphs and Hypergraphs", North Holland Company, 1973, pp. 389-413.

Chen, P., "The Enity-Relationship—Toward a Unified View of Data", ACM Trans. on Database Systems, Mar. 1976, pp. 9-36.

Primary Examiner—Gareth D. Shaw
Assistant Examiner—Kevin A. Kriess
Attorney, Agent, or Firm—Robert O. Nimtz

[57] ABSTRACT

A data base system is disclosed in which records are locked out during record changing by using a dynamically generated directed acyclic graph of the records. The edges of the graph, stored in the records themselves, point toward a "root" record representing multiply-shared information. An application to the assignment of telephone facilities to telephone subscribers is also described. A transaction list is maintained to identify locked out records previously locked out during the same transaction.

9 Claims, 9 Drawing Figures

LOCKING GRAPH

RECORD-PAIR   0101-121

(a) BODY
 1) TYPE  PAIR
 2) ID    388
 3) RMK   F2 PAIR
 4) EI    NO
 5) LK    453

(b) EDGE
 1) TYPE 1 CABLE
 2) ID1   433
 3) RITN  DELETOR (c) EDGE
 1) TYPE 1 PAIR
 2) ID1   391
 3) TYPE 2 TERMINAL
 4) ID2   211
 5) PATH  CENT. OFF.

(d) EDGE
 1) TYPE 1 TERMINAL
 2) ID1   211
 3) BUDPST
 4) SIDE  OUT (e) EDGE
 1) TYPE 1 TERMINAL
 2) ID1   642
 3) COLOR BLUE-GREEN
 4) SIDE  IN (f) EDGE
 1) TYPE 1 TERMINAL
 2) ID1   642
 3) TYPE 2 IU
 4) ID2   105
 5) PATH  FIELD (g) EDGE
 1) TYPE 1 NAME
 2) ID1   326
 3) EXID  101-121

(h) EDGE
 1) TYPE 1 LOOP
 2) ID1   232

FIG. 9
LOCKING GRAPH

DATA BASE LOCKING

This application is a continuation, of application Ser. No. 441,732, filed Nov. 15, 1982, now abandoned.

TECHNICAL FIELD

This invention relates to data bases and, more particularly, to locking data bases to prevent multiple simultaneous modifications to a single data base entry.

BACKGROUND OF THE INVENTION

It is well-known to use digital storage facilities and a programmed digital computer to provide, respectively, a data base storage medium and a data base manager. The storage facilities serve to store large amounts of information in digital form while the data base manager is a computer program facility for reading, writing and searching the data base.

It is convenient to define a "record" as a basic data base unit. Each record consists of a number of "fields" which store specific information which constitutes the content of the record. A number of similar records comprises a "file." A "transaction" is a set of steps or procedures which take the data base file from one consistent state to another consistent state by modifying the fields in the records.

It is often necessary to change records in a data base, sometimes to correct errors, and sometimes to reflect changes in the physical world such as additions or deletions to inventory or consumption of resources. Indeed, with large data bases having many users, it is possible to have more than one user simultaneously access a record and attempt to change that record. This possibility of multiple simultaneous access must be prevented to guard against ambiguity concerning the contents of the data base. That is, data base records which are in use by one user must be locked out of use for all other users. This is the well-known data locking problem which arises whenever there is a concurrency of multiple transactions.

It is, of course, possible to lock out the entire data base while any user is accessing that data base. This is not a practical solution for large data bases with many users because an unacceptably low number of serial transactions can take place against the data base. The system throughput can then become inadequate to fill the requirements of the application. In an airline reservation system, for example, reservation posting for one day's flights might well take longer than the number of hours in a day.

On the other hand, only the record being actually accessed can be locked out, with all other records remaining accessible. Since a significant amount of time is required to lock and unlock each data record, however, expending this time for every record accessed may well also reduce the system throughput below acceptable levels.

What is desired is a compromise which locks out a block of records which is a relatively small subset of the entire data base, and yet which includes a significantly related set of individual records. While subset locking can be and has been done arbitrarily, optimum performance requires that several other parameters be met. The overhead involved in placing and detecting data locks must be kept to a minimum and the locked subset should preferably not be arbitrarily chosen.

SUMMARY OF THE INVENTION

In accordance with the illustrative embodiment of the present invention, data record subsets in a data base are selected optimally for data lockout and such lockout is assisted by local lists, one for each transaction. Internally explicit relationships between the data records are used to select the subset of records for locking which includes the records most likely to affect each other by changes. Moreover, only one record of each subset is locked out by the file system. The identifications of the remaining records of each subset are kept on a lock-out list associated with each transaction which can be returned to determine the lock-out status of these other records. The burden on the file system lock-out mechanism is thereby minimized.

DETAILED DESCRIPTION

Figure 1:
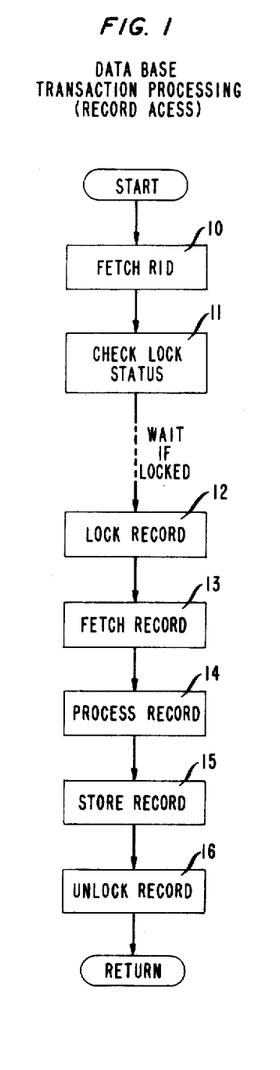
FIG. 1 is a general flow chart of the locking procedure in a computerized data base management system.

Referring more particularly to FIG. 1, there is shown a generalized flow chart of the file access process in a typical data base management system. The process starts at box 10 with the request to access (FETCH) the record identified with the noted record identification (rid) number. In box 11, the lock status of this record is checked, using either local or global locking information. If the record has been locked by some other transaction, the present transaction simply waits for the lock to clear.

When the record to be accessed is no longer locked, box 12 is entered in which the record to be accessed is locked to prevent other users from gaining access while this user is in the process of using the record. Once the record access is locked, the data base manager can access the record in box 13 and bring it into the work space of the computer. As noted in box 14, application programs can process the record to change the record contents.

When manipulation or use of the record is complete, the record can be returned to the data base, using box 15. Finally, in box 16, after the record is returned to the data base, the file access is unlocked and the procedure returns to the original request point.

The access procedure of FIG. 1 is perfectly general and can be used for virtually all data base systems. In order to make this process more specific, a particular data base and data base application will be described in detail so that the locking procedure of the present invention will be more readily understood.

Figure 2:
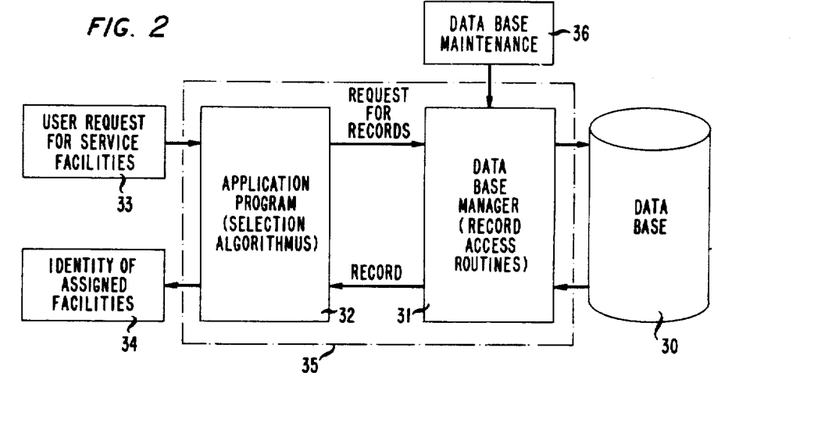
FIG. 2 is a block diagram of one application of a data base for the assignment of facilities to users of those facilities.

Referring more particularly to FIG. 2, there is shown a general block diagram of a particular data base application. The information processing system of FIG. 2 comprises a data base 30, illustrated as being contained on a magnetic disc-pack, a data base manager 31, a group of application programs 32, an input device 33 and an output device 34. The data base manager 31 and the application programs 32 are both computer programs, written in source code by programmers, compiled into object code by a compiler program (not shown) and loaded into the internal memory of a general purpose data processor 35. The file locking mechanism is usually part of the data base manager 31.

The input device 33 provides a request to the application programs 32 for service requiring information in the data base 30. Application programs 32 decide what information is required to fill the service request and format a request for specific records and forward that request to the data base manager 31. The data base manager 31 retrieves or stores records.

The record access routines of data base manager 31 retrieve the desired record from data base 30 and pass the information as values back to application programs 32. These records will then be utilized, and possibly changed, by application programs 32 to provide the particular service requested by input device 33. The result will be forwarded to output device 34.

While device 33 may be a keyboard and device 34 a display screen in an integral terminal operated by a human user, device 33 may just as well be an automatic electronic or mechanical device (e.g., a parts counter in an assembly line) and device 34 may likewise be an automatic device (e.g., a purchase order generator to reorder inventory parts when levels fall too low). Thus the system of FIG. 2 is a service-providing system rather than simply an information-providing system. The service (inventory control, facilities assignments, ticket preparation, etc.) depends on the availability of the information in data base 30, but goes beyond that information to provide a basis for service of some type in the outside world.

Having explained the present invention in a generalized way in connection with FIGS. 1 and 2, the balance of the figures will be used to explain in detail a particular application of the data base representation. This application is the assignment of physical facilities (wires, cables, terminal boxes, etc.) to a telephone subscriber in order to connect that subscriber telephone to the local telephone central office. While such assignments are maintained for a relatively long period of time, customers do move and facilities must be reassigned. In central offices serving tens of thousands of customers, such reassignments of facilities constitute a major, labor-intensive activity. Maximizing the efficiency and minimizing the cost of such reassignments has therefore become an important telephone company activity.

Figure 3:
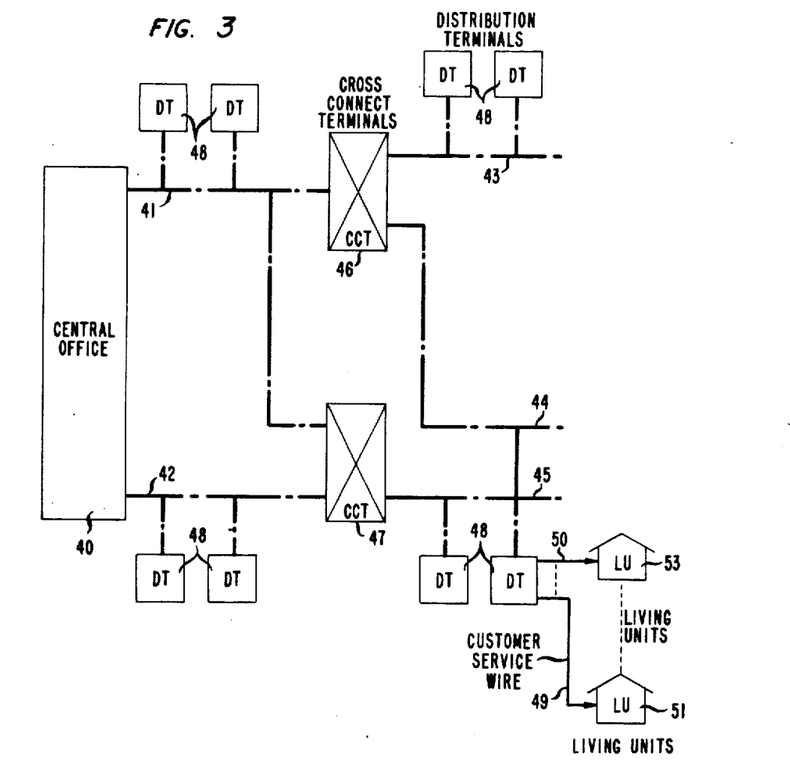
FIG. 3 is a generalized block diagram of the telephone outside plant facilities used in providing telephone service.

Referring then to FIG. 3, there is shown a schematic diagram of typical facilities used to connect a telephone subscriber to the local central office. Since these facilities are all outside of the central office 40, they have been termed "outside plant" facilities. Such outside plant facilities consist of multiconductor cables such as cables 41 through 45, each of which includes a large number of twisted pairs of copper wires, multichannel pair-gain systems, or optical fibers. In general, one twisted pair is used to provide telephone service to one customer. Some areas require three or more levels of cable (f3, f4, etc.) in the outside plant interconnection system.

Cross-connect terminals 46 and 47 are devices for connecting electrical wire pairs to each other. They have one set of binding posts for connecting wire pairs from the central office side (the IN side) and another set for connecting wire pairs from the other (field) direction (the OUT side). In addition, cross-connect terminals have jumper wires selectively interconnecting selected IN pairs with selected OUT pairs, thereby effectuating the physical interconnection between distribution cables pairs and feeder cable pairs. Cables and pairs have central office ends and field ends.

At selected points along cables 41 through 45 are distribution terminals 48. These distribution terminals also have binding posts for connecting cable pairs to customer service wires such as drop wires 49 and 50 connected to customer living units 51 and 53, respectively. Distribution terminals are typically located at concentrations of subscriber living units and can be located on telephone poles, in pedestals or on customers' premises.

The assignment problem in providing telephone service to the living unit of a telephone subscriber is to assign, in the data base, the necessary cable pairs, terminals, binding posts and customer service wires to create a complete and continuous electrical circuit (a local loop) between the customers' telephone set and the central office. Once the assignment is made in the data base, the corresponding physical connections have to be made out in the field at the time service is to be initiated.

Figure 4:
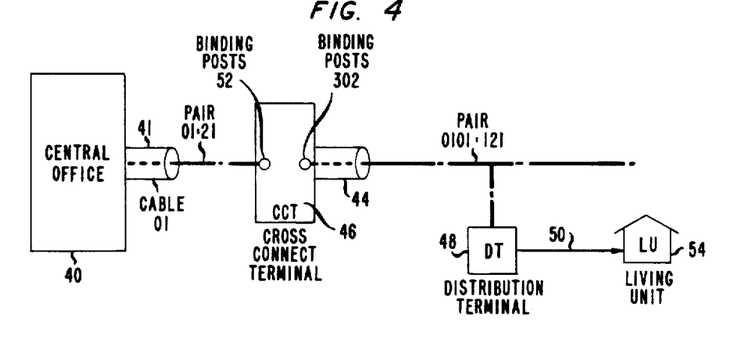
FIG. 4 is a graphical representation of typical outside plant facilities used to provide service to a particular telephone subscriber.

In FIG. 4 there is shown the specific facilities assigned to provide telephone service to living unit 53 in FIG. 3. Thus, cable 41 connecting central office 40 with cross-connect terminal 46 is identified as cable "01". The specific pair in cable 01 assigned to living unit 53 is pair "21", represented by the cable-pair dyad "01:21." The field end of pair 01:21 is connected to binding posts 52 on the IN side of terminal 46. The IN binding posts 52 are cross-connected by wire jumpers to OUT binding posts 302. The central office end of the 121st pair of cable 44 (pair 0101:121) is connected to binding posts 302 in terminal 46. At the other (field) end, the pair 0101:121 is connected through distribution terminal 48 to drop wire 50 and thence to living unit 53.

It will be noted that each facility used for this loop has both a type (pair, cable, terminal, etc.) and an identification (pair 01:21 terminal 46, binding posts 302, etc.). The general problem is to create a data base which serves as an inventory of the facilities and simultaneously facilitates the assignment and reassignment of those facilities into service-providing loops between customers and the central office.

Figure 5:
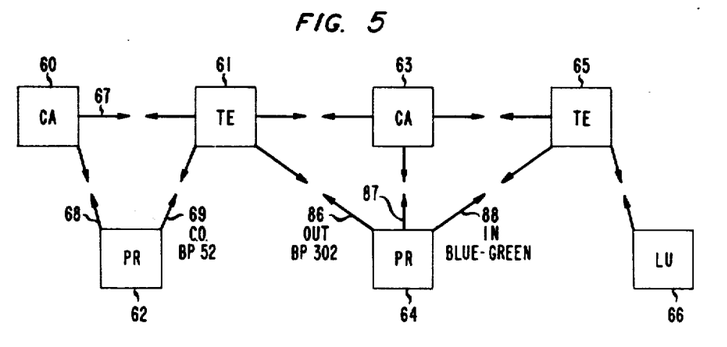
FIG. 5 is a directed graph representation of an inventory of the facilities shown in FIG. 4.

In FIG. 5 there is shown a standard directed graph representing the inventory of facilities making up the outside plant facilities illustrated graphically in FIG. 4. Each box in FIG. 5 is a node of the graph and one node is provided for each physical entity in the inventory. Thus box 60 is a graph node representing cable 41, node 61 represents cross-connect terminal 46, node 62 represents pair 01:21, node 63 represents cable 44, node 64 represents pair 0101:121, node 65 represents distribution terminal 48 and node 66 represents living unit 53. These nodes are the entities in the entity-relationship data base.

The relationships between these entities are represented in FIG. 5 by the directed arrows between the nodes. Thus, arrow 67 represents the relationship "connected to" since cable 41 is connected to terminal 46. Arrow 68 represents the relationship "included in" since pair 01:21 is included in cable 41. Finally, the arrow 69 represents the relationship "connected to" and carries further information identifying the binding posts ("CO BP 52"), i.e., binding posts 52 on the central office (IN) side of terminal 46. The other directed arrows in FIG. 5 have analogous meanings and will not be further discussed here, except to note that the distribution terminal 48 and the living unit 53 have "served by" and "serves" interrelationships and the customer service wire 50 has been left out for simplicity.

Figure 6:
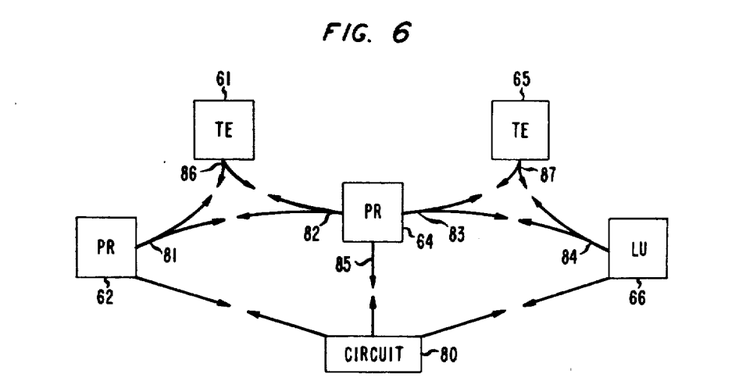
FIG. 6 is a directed graph representation of the connectivity of the facilities shown in FIG. 4.

The inventory information contained in FIG. 5 is necessary to keep track of the physical facilities used in the loop plant. It is not particularly convenient, however, in assigning an electrical circuit (a loop) to a customer. In FIG. 6 there is shown another set of edges between these same nodes that better serve the loop assignment need.

In FIG. 6, the same nodes shown in FIG. 5 are repeated (except for the cable nodes) and a circuit node 80 has been added. The graph of FIG. 6 can be said to represent the connectivity of the communication circuit as distinguished from the inventory of the parts (FIG. 5). The circuit (usually called a "loop" and named with a telephone number in node 80) is composed of three parts: pair 01:21, pair 0101:121 and living unit 53 (along with drop wire 50). These three parts are connected to each other through terminals. For efficiency of assignment processing, it is desirable to know directly that pair 01:21 is connected to pair 0101:121. At the same time, it is necessary to know that the interconnection takes place in a specific terminal and at specific binding posts. The edges 81 and 82 are used to simultaneously point to the connected pair and the terminal through which this connection is effected. The representation of FIG. 5 in which the pair-to-pair connection could be discovered by further searching in the data base is very inefficient for assigning facilities.

The interconnection of pair 0101:121 (box 64) and living unit 53 (box 66) is likewise represented by two edges 83 and 84, serving the same function for this part of the circuit. It should be noted that a rearrangement of the jumper wires could be used to reassign the physical facilities to other circuits without changing the inventory. That is, the connectivity of FIG. 6 could change without changing the inventory of FIG. 5.

The graph of FIG. 6 serves to maintain an inventory of assigned electrical circuits while that of FIG. 5 maintains an inventory of physical parts. Both are necessary to describe the inventory of loops of the telephone subscribers.

Figure 7:
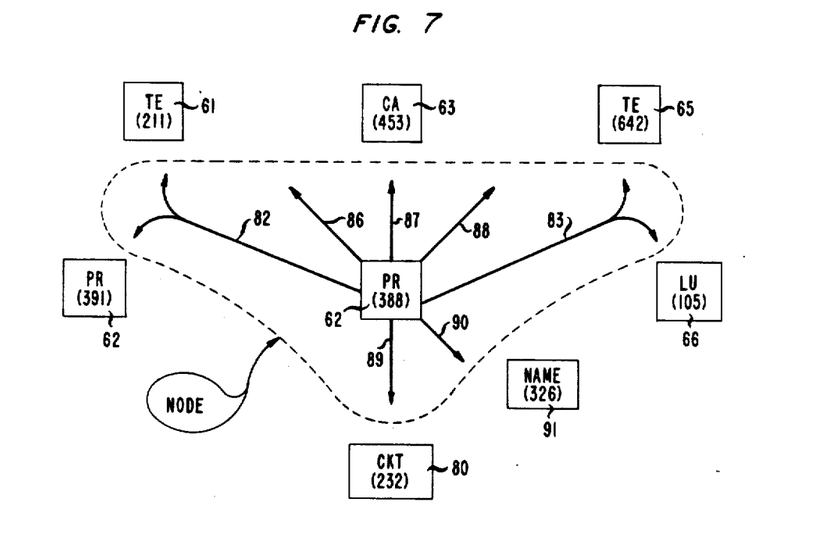
FIG. 7 is a complete graphical representation of one node of the graph of FIG. 6.

In FIG. 7 there is shown a graphical representation of one record of the data base used to represent both the physical facilities and the circuit assignment illustrated in FIG. 3. The record represented in FIG. 7 is that representing pair 101:121. The record includes a body portion (box 62) and a plurality of edges 82,83,86,87,88 and 89, some of which (82 and 83) are hyperedges. The record illustrated in FIG. 7 contains all of the information about pair 0101:121 that is in the data base. It will be noted that the "name" of this pair by which it is known in the outside world (pair 101:121) is a separate entity 91 pointed to by edge 90. The internal identification of each record is by way of an internal number which permits direct access to the associated record. Moreover, the external name of an entity can change without changing all of the internal references thereto.

Figure 8:
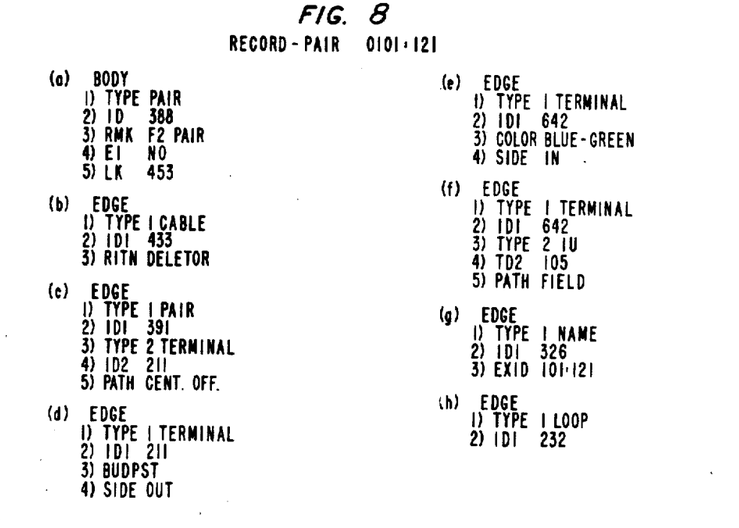
FIG. 8 is a typical data base record for the node of FIG. 7, illustrating the locking information.

In FIG. 8 there is shown an alphanumeric representation of the record in the data base for pair 0101:121. The body portion of the record appears first, but the edges are ordered haphazardly. A specific edge must be searched for in this arrangement. Alternatively, the edges could be ordered in a preselected sequence and accessed directly. The contents of the data record of FIG. 8 will now be discussed.

It will be first noted that each physical facility is identified with an internal identification number different from the name by which it is known in the external world. These internal identification numbers simplify the computer record-keeping and permit arbitrary and changeable names in the outside world. A special edge 90 points to the external identification 91 ("pair 0101:121.") as shown in FIG. 7, and at lines g1–g3 in FIG. 8.

Edges at lines c1–c5 and f1–f5 are hyperedges, each including two record identifications. Each body or edge has one or more lines of so-called "application data," i.e., information useful in applying the data base information to a problem in the outside world. For example, at line c-5, the edge is identified as pointing to binding posts on the central office side of the terminal (as distinguished from the "field" side of the terminal). At line e-3, the pair is connected to the "blue-green" stub wires on the "IN" side of the distribution terminal (as distinguished from "OUT" side). The edge h1–h2 identifies the loop circuit of which this pair is a part.

As is usual in data bases of this sort, it is necessary to prevent more than one user from modifying any record of the data base at the same time to prevent ambiguities in the record content. Moreover, the usual solutions of locking out each record accessed, or locking out all records when any one of them is accessed, have grave disadvantages. The overhead involved in locking out each record individually is prohibitive in both processor time and memory space. Locking out all records for each access, on the other hand, forces all accesses to be sequential, thus prohibitively reducing the number of transactions per hour which can be handled. Neither approach is feasible for the illustrative telephone loop facilities assignment and control system described above.

In accordance with the present invention, the solution to this problem is accomplished by locking a small subset of records including the record accessed and leaving all other records open for simultaneous access. More specifically, the attributes of the physical system represented by the data base records is exploited to choose a subset of records which is of reasonable size and which also is functionally related in such a way that denial of access at a single record protects an entire dependent multirecord data structure from access. In the particular system of FIGS. 3 through 8, locking the f1 feeder cable record (the cable closest to the central office) serves to prevent access to all pairs, terminals, distribution cables and living units which could be served by that feeder cable. Since all assignments of facilities require the assignment of the appropriate feeder cable, if that feeder cable is locked out, all facilities connectable to that feeder cable can likewise be denied access.

In further accord with the present invention, locking is accomplished with the aid of a locking graph, i.e, a system of vertices and edges superimposed on the directed graph represented by FIGS. 7 and 8. This superimposed locking graph includes all of the vertices of the original graph (all of the physical facilities) but includes only those edges pointing toward a feeder cable. The resulting directed acyclic graph (DAG) can be walked by well-known methods to identify all feeder cables from which any particular record can be accessed. These feeder cable records are then locked to insure denial of a second access to any previously accessed records.

In yet further accord with the present invention, the superimposed directed acyclic graph is contained in separate locking field LK (line a-5) appended to the body of each record. The ready availability of the locking path for each record in the record itself greatly reduces the processing time necessary to lock that record and thus further reduces the overhead for locking and increases the speed of locking and unlocking records.

Figure 9:
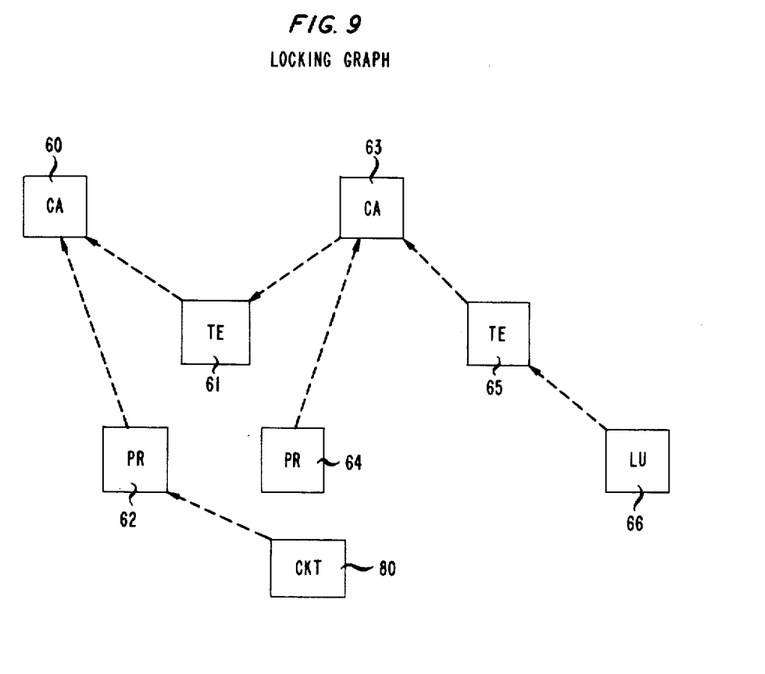
FIG. 9 is a graphical representation of a portion of a directed acyclic graph for locking nodes in the graph of FIG. 6.

In FIG. 9 there is shown a partial locking graph for the directed graph of FIGS. 5 and 6. Reference numerals common to FIG. 5 are repeated in FIG. 9. The edges shown in FIG. 9 are only those edges pointing back toward the f1 cable 60 (or other f1 cables). Each f1 cable record can therefore be thought of as the "root" of a tree including all other records accessible through the f1 cable record. The locking algorithm, then, simply consists of using the locking entry of the accessed record to walk the directed acyclic graph (DAG) to each of its roots and to lock each root (each f1 cable). Since such a DAG has few roots, this process can be accomplished quickly and with little software overhead.

In FIG. 8, the locking DAG information is found in line a-5 where the "LK" lock edge is identified as pointing toward node 453, i.e., cable 63. This information is used by the data base manager to rapidly lock out this record and all other records up to and including the f1 cable record 60.

The locking of records is accomplished as shown in the pseudo-code of Table I. A list (LIST) is constructed during each transaction so that all records already locked are on the list. In this way, much time is saved in not attempting to lock records already locked by a previous portion of a transaction. Since most transactions involve records on the same branch of the locking DAG, maintaining LIST is well worthwhile.

TABLE I

```
procedure lock (rid)
    if rid is in LIST then return;
    node_a = read (rid);
    if LK (node_a) is empty then
        DBMSLOCK (rid)
        add rid to LIST;
        return;
    else
        lock (LK(node_a));
        node_b = read (rid);
        if LK(node_a) = LK (node_b) then
            add rid to LIST;
            return;
        else
            lock (rid);
            return;
```

The procedure "DBMSLOCK" actually locks the root record (the record with no "LK" entry) and is specific to the hardware system used.

What is claimed is:

1. In a data base management system, a method for locking records comprising the steps of
   (1) creating a directed acyclic locking graph of information records in said data base system, said locking graph associating related subsets of said records with a common root record,
   (2) accessing a record in said data base system,
   (3) for each record accessed, using said locking graph to identify a closest root record of said accessed record, and
   (4) locking said root record to prevent concurrent access to said accessed record.

2. The method of locking records according to claim 1 wherein said step of creating a directed acyclic locking graph further includes the step of
   (5) providing in each said record a storage location for identifying a next nearest neighbor to said record in said directed acyclic graph.

3. The method of locking records according to claim 1 further including the steps of
   (5) maintaining a list of records previously locked,
   (6) checking the present record against said list before performing steps (3) and (4), and
   (7) performing steps (3) and (4) only if said list does not include the present record.

4. The method of locking record according to claim 1 wherein step (1) comprises the substeps of
   (1a) associating said records in a "used in" or "included in" hierarchy, and
   (1b) selecting edges for said directed acyclic locking graph representing said "used in" or "included in" relationship between records.

5. Apparatus for providing data locking in a data base system including a plurality of records, said apparatus comprising
   means for representing a directed acyclic locking graph of all of said records, said locking graph identifying related subsets of said records showing a common root record, means for accessing a record in said data base system,
   means, utilizing said graph representation, for locating a root record closest to said accessed record in said graph, and
   means for locking said root record to prevent further access to said accessed record.

6. Apparatus according to claim 5 further comprising means in each said record except said root records for storing at least one of the edges of said directed acyclic graph.

7. Apparatus according to claim 5 further comprising means for storing a list of records previously locked, and
   means for disabling said locating and locking means if said accessed record is on said list.

8. A method for locking selected record subsets in a data base system said method comprising the steps of
   (a) including, in each record of said data base, an identification of another data base record, said identifications together representing a directed acyclic locking graph for one of said subsets,
   (b) utilizing said identifications to identify a closest root record of said acyclic locking graph and
   (c) locking said root record to prevent concurrent access to said record being accessed.

9. Apparatus for locking only selected record subsets in a data base system, said apparatus comprising means for including, in selected ones of said data base records, a pointer to one other data base record, said identifications together comprising a directed acyclic graph for at least one selected record subset, means for testing said acyclic locking graph to identify a root record thereof when attempting to access a data base record, means for locking said root record if not already locked, and means for preventing access to said data base record being accessed if said root record is already locked.

* * * * *